(12) United States Patent
Suganuma et al.

(10) Patent No.: US 8,171,956 B2
(45) Date of Patent: May 8, 2012

(54) LIQUID SUPPLY METHOD AND APPARATUS

(75) Inventors: Toshikazu Suganuma, Chiba (JP); Yasushi Tomita, Chiba (JP); Kazunari Sakai, Yotsukaido (JP); Naoki Hada, Sakura (JP); Katsuhiko Kazama, Chiba (JP)

(73) Assignees: Dainippon Ink and Chemicals, Inc., Tokyo (JP); KITZ SCT Corporation, Tokyo (JP)

( * ) Notice: Subject to any disclaimer, the term of this patent is extended or adjusted under 35 U.S.C. 154(b) by 0 days.

(21) Appl. No.: 10/574,954

(22) PCT Filed: Oct. 15, 2004

(86) PCT No.: PCT/JP2004/015644
§ 371 (c)(1),
(2), (4) Date: Apr. 7, 2006

(87) PCT Pub. No.: WO2005/038895
PCT Pub. Date: Apr. 28, 2005

(65) Prior Publication Data
US 2007/0125423 A1    Jun. 7, 2007

(30) Foreign Application Priority Data

Oct. 21, 2003  (JP) ................................ 2003-361174

(51) Int. Cl.
*G05D 11/02*    (2006.01)
*F04F 5/02*    (2006.01)
(52) U.S. Cl. ......... 137/605; 137/806; 417/178; 417/182
(58) Field of Classification Search .................. 137/605, 137/606, 806; 417/178, 182
See application file for complete search history.

(56) References Cited

U.S. PATENT DOCUMENTS 3,410,531 A * 11/1968 Baker ........................... 422/135
(Continued)

FOREIGN PATENT DOCUMENTS

JP    60048160 A * 3/1985
(Continued)

OTHER PUBLICATIONS

Office Action mailed Apr. 21, 2011, issued for the Taiwanese patent application No. 093131616.

*Primary Examiner* — Craig Schneider
*Assistant Examiner* — Atif Chaudry
(74) *Attorney, Agent, or Firm* — Edwards Wildman Palmer LLP

(57) ABSTRACT

There is provided a liquid supply method in which, when preparing a solution that can be used as washing water and the like by supplying a minute amount of chemicals and the like to ultrapure water, the amount of supply solution that is supplied can be accurately determined. In this liquid supply method, a solution is prepared by supplying a supply liquid to a primary fluid that is circulating in a primary fluid circulation tube (2). This liquid supply method uses a liquid supply apparatus (1) that includes: a supply section (3) that delivers the supply liquid; and a supply liquid circulation tube (4) that causes the supply liquid to flow from the supply section (3) to the primary fluid circulation tube (2), the internal diameter of the supply liquid circulation tube (4) being between 0.01 and 1 mm. When the supply solution is supplied from the supply section (3) to the primary fluid circulation tube (2) via the supply liquid circulation tube (4), a pressure P1 of the supply liquid in the supply section (3) and a pressure P2 of the primary fluid in the primary fluid circulation tube satisfy the formula P1−P2>0.

2 Claims, 1 Drawing Sheet

U.S. PATENT DOCUMENTS

| | | | |
|---|---|---|---|
| 3,652,109 A * | 3/1972 | Van Zon | 285/148.22 |
| 5,016,817 A * | 5/1991 | Ghate et al. | 239/113 |
| 6,129,098 A | 10/2000 | Miki et al. | |
| 6,518,721 B2 | 2/2003 | Mayama | |
| 2004/0206634 A1 * | 10/2004 | Shirakashi et al. | 205/641 |
| 2005/0173003 A1 * | 8/2005 | Laverdiere et al. | 137/487.5 |
| 2006/0144777 A1 * | 7/2006 | Kumano et al. | 210/321.79 |

FOREIGN PATENT DOCUMENTS

| | | |
|---|---|---|
| JP | 07-60082 | 7/1995 |
| JP | 11-70328 | 3/1999 |
| JP | 11-139804 | 5/1999 |
| JP | 2000-208471 | 7/2000 |
| TW | 200303232 | 9/2003 |

* cited by examiner

LIQUID SUPPLY METHOD AND APPARATUS

BACKGROUND OF THE INVENTION

1. Field of the Invention

The present invention relates to a liquid supply method and apparatus that are used in the preparation of solutions. Specifically, the present invention relates to a liquid supply method and apparatus that are used to supply a solution which is to be supplied such as an electrolytic aqueous solution to a primary fluid such as ultrapure water, and to prepare a solution that can be used as washing water for electronic material.

2. Description of Related Art

In the manufacture of electronic material such as semiconductor devices and liquid crystal panels, when a substrate is washed using ultrapure water or when a wafer is cut by a dicing machine, because the ultrapure water has a high specific resistance static electricity is generated and there are occurrences of electric breakdown or the absorption of minute particles. This has marked adverse effects on the substrate yield.

Therefore, in order to solve this problem, a method is known in which the specific resistance of the ultrapure water is lowered by dissolving an electrolyte such as, for example, carbon dioxide or ammonia in the ultrapure water.

In the processes of washing and dicing a silicon wafer, the specific resistance tends to vary frequently because there is considerable variation in the flow rate of the ultrapure water.

One method of suppressing variation in the specific resistance is the technology disclosed in U.S. Pat. No. 6,518,721. In the method described here, the ultrapure water is divided into two branch flows that each have a different flow rate. An electrolyte is then dissolved into the branch flow having the smaller flow rate, and the electrolytic aqueous solution thereby obtained is then merged with the branch flow having the larger flow rate.

As a result, variations in the specific resistance can be suppressed even if variations occur in the flow rate of the original ultrapure water.

However, in this method, because the mixing rate of the electrolytic aqueous solution with the ultrapure water is slow, if there is a considerable variation in the flow rate of the original ultrapure water, then it is difficult to maintain a constant specific resistance.

Moreover, in the manufacture of electronic material such as semiconductor devices and liquid crystal panels, because various matter that needs to be removed (i.e., particles, organic contaminants, metal contaminants, and the like) is generated during the processes, it is necessary for these to be removed by washing.

One method of washing organic contaminants and metal contaminants that have adhered to electronic material such as a semiconductor substrate or a liquid crystal glass substrate is to employ what is known as RCA washing in which they are washed using washing water obtained by mixing hydrogen peroxide solution and a chemical solution having oxidizability.

However, in this washing method, huge expenses are incurred in the chemical solution, ultrapure water, and waste solution processing, and there is also the problem that there is a heavy burden on the environment.

In recent years, it has been discovered that water that has been obtained by adding small amounts of chemicals and gas components to ultrapure water has the effect of removing impurities from a wafer surface, and that this water demonstrates the same washing effects as conventional highly concentrated chemical solutions.

One technology that uses washing water obtained by adding the aforementioned chemicals and gas components to water is an apparatus for preparing electronic material washing water that has a chemical solution supply apparatus that adds a chemical solution containing acid or alkaline to ultrapure water, and then controls the quantity of chemical solution that is supplied based on the electric conductivity of this chemical solution-containing ultrapure water (see Japanese Patent Application, First Publication (JP-A) No. 2000-208471).

In this conventional method, precise concentration control is possible, however, during actual use there is a possibility that hunting will occur in the concentration if variations occur in the flow rate of the ultrapure water. In addition, the apparatus is complex and the costs involved are high.

Furthermore, if the above chemical solution supply apparatus is used in applications that have an extreme aversion to metal ions (such as, for example, the manufacturing of semiconductors), then it is necessary for the material of components of the chemical solution supply apparatus that come into contact with the solution to be formed from synthetic resin.

Because it is difficult to manufacture miniature flow quantity meters and miniature flow quantity adjusting valves using synthetic resin for solution-contacting components, it is not possible to add highly concentrated original chemical solutions unmodified to ultrapure water. Because of this, it is necessary to use low concentration chemical solutions in which the original solution has been diluted. However, if a low concentration chemical solution is used, then it is necessary to perform a process to adjust the concentration of the chemical agent. This makes it easy for variations to occur in the concentration of the chemical solution.

The present invention was conceived in view of the above described circumstances, and it is an object thereof to provide a supply method and apparatus that make it possible to precisely control supply quantities of a solution being supplied when preparing a solution that can be used as washing water by supplying minute quantities of chemical solution or the like to ultrapure water or the like.

SUMMARY OF THE INVENTION

As a result of repeated intense research in order to solve the above described problems, the present inventors discovered that, by using a narrow diameter supply liquid circulation tube such as a tube in the shape of a hollow fiber, it is possible to easily and accurately determine minute supply quantities of supply solution and, on the basis of this discovery, attained the present invention.

The present invention is a liquid supply method that prepares a solution by supplying a supply liquid to a primary fluid that is circulating in a primary fluid circulation tube, that uses a liquid supply apparatus that includes: a supply section that delivers the supply liquid; and a supply liquid circulation tube that causes the supply liquid to flow from the supply section to the primary fluid circulation tube, the internal diameter of the supply liquid circulation tube being between 0.01 and 1 mm, wherein when the supply solution is supplied from the supply section to the primary fluid circulation tube via the supply liquid circulation tube, a pressure $P1$ of the supply liquid in the supply section and a pressure $P2$ of the primary fluid in the primary fluid circulation tube satisfy the formula $P1-P2>0$.

In the present invention, a liquid supply apparatus that prepares a solution by supplying a supply liquid to a primary fluid that is circulating in a primary fluid circulation tube includes: a supply section that delivers the supply liquid; and a supply liquid circulation tube that causes the supply liquid to flow from the supply section to the primary fluid circulation tube, the internal diameter of the supply liquid circulation tube being between 0.01 and 1 mm, wherein when the supply solution is supplied from the supply section to the primary fluid circulation tube via the supply liquid circulation tube, a pressure P1 of the supply liquid in the supply section and a pressure P2 of the primary fluid in the primary fluid circulation tube satisfy the formula P1−P2>0.

In the present invention, when a supply liquid is supplied from a supply section to a primary fluid circulation tube via a supply liquid circulation tube using a narrow diameter supply liquid circulation tube, a pressure P1 of the supply liquid in the supply section and a pressure P2 of the primary fluid in the primary fluid circulation tube are made to satisfy the formula P1−P2>0.

As a result, it is possible to set the supply amount of the supply solution using the differential pressure between the upstream side and the downstream side of the supply liquid circulation pipe.

Because of this, it is possible to easily and accurately determine minute supply quantities of supply solution.

Accordingly, it is possible to prevent variations in the concentration of the solution even if a high concentration of supply solution is used and the amount of the supply is minute.

DETAILED DESCRIPTION OF THE INVENTION

Figure 1:
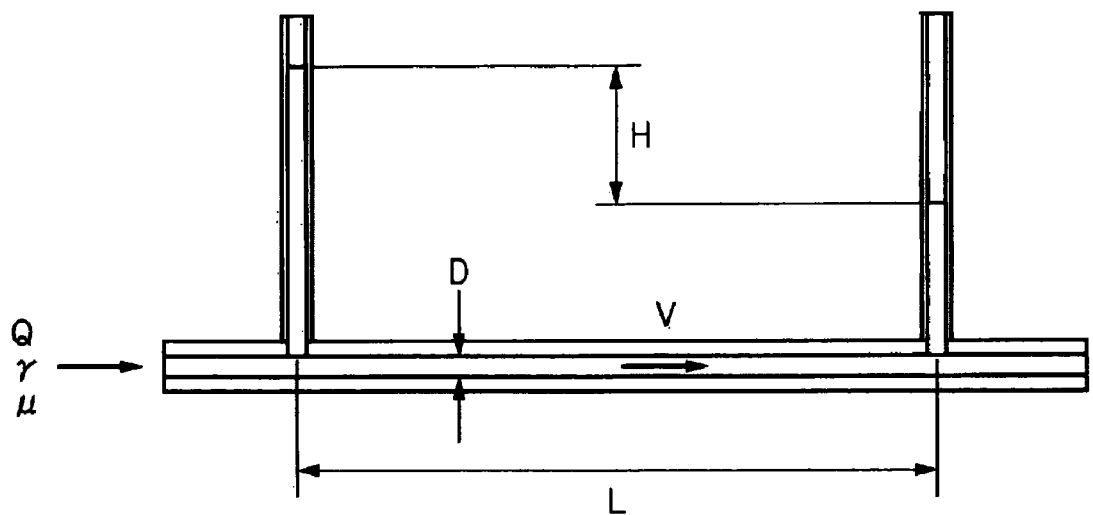
FIG. 1 is an explanatory view of Hagen-Poiseuille's law that is used in the liquid supply method of the present invention.

The liquid supply method of the present invention is a method of supplying a supply liquid to a primary fluid that is circulating in a primary fluid circulation tube. This liquid supply method employs a liquid supply apparatus that is provided with a supply liquid circulation tube that is located between a supply section that delivers the supply liquid and the primary fluid circulation tube. In this method, a supply quantity is set for the supply liquid using a pressure difference between an upstream side and a downstream side of the supply liquid circulation tube.

It is preferable that the supply liquid circulation tube is formed in the shape of a hollow fiber. The term "hollow fiber shape" refers to a fibrous tube-shaped structure having a hollow interior.

By using a hollow fiber-shaped circulation tube, it becomes easier to design a liquid supply apparatus. Namely, by selecting the internal diameter, the length, and the number of the hollow fiber-shaped circulation tubes, it becomes easy to set the supply quantity of the supply liquid to an appropriate value.

The internal diameter of the supply liquid circulation tube is 0.01 to 1 mm (i.e., 10 to 1000 μm) and preferable 0.05 to 0.5 mm (i.e., 50 to 500 μm).

If this internal diameter is below this range, then the flow resistance increases and it is no longer easy to set a flow quantity for the supply liquid. If the internal diameter exceeds this range, then there is a reduction in accuracy when setting the flow quantity of the supply liquid.

A separating membrane, for example, a microporous membrane, a homogeneous membrane, an inhomogeneous membrane, a composite membrane, a sandwich membrane and the like can be used for the hollow fiber-shaped supply liquid circulation tube. Examples of a sandwich membrane include a membrane having a structure in which an intermediate membrane that is made from a polyurethane resin or the like is sandwiched between two microporous membranes that are formed from polypropylene resin or the like.

Hollow thread-shaped fiber that is used for clothing or industrial purposes can also be used.

If the supply liquid circulation tubes are to be used in the preparation of water for washing electronic material, then it is preferable that a material other than a metal is used for the material thereof. Preferably, this material has excellent durability towards electrolytic aqueous solutions. Preferable examples of such a material include: various types of fluorine resin such as polytetrafluoroethylene, perfluoroalkoxy fluorine resin, and polyhexafluoropropylene; and various types of polyolefin resin such as polybutene based resins, silicone based resins, polyethylene based resins, polypropylene based resins, and poly (4-methylpentene-1) based resins. Among these, poly (4-methylpentene-1) based resins are particularly preferable.

Note that the internal diameter of the primary fluid circulation tube through which a primary fluid such as ultrapure water is circulated is normally 1 inch (approximately 25.4 mm) or less.

The liquid supply method of the present invention is a method that uses Hagen-Poiseuille's law relating to pressure loss in laminar flows within a pipe.

A description will now be given of Hagen-Poiseuille's law.

As is shown in FIG. 1, a loss of head H (i.e., a pressure loss) of a fluid circulating through a circular pipe can be expressed by Formula (1) in the case of a laminar flow, while the length of the circular pipe is expressed by Formula (4), which is a modification of Formula (1).

[1]

$$H = \frac{32 \cdot \mu}{\gamma} \cdot \frac{L}{D^2} \cdot V \quad (1)$$

Hagen-Poiseuille's law $$\gamma \cdot H = \Delta P \quad (2)$$

$$V = \frac{Q}{\pi \cdot D^2 / 4} \quad (3)$$

$$\Delta P = 32 \cdot \mu \cdot \frac{L}{D^2} \cdot V = \frac{32 \times 4}{\pi} \cdot \mu \cdot Q \cdot \frac{L}{D^4} \quad (4)$$

$$L = \frac{\pi}{128} \cdot \frac{\pi}{\mu \cdot Q} \cdot \Delta P \quad (5)$$

The meaning and units of the symbols shown in the formulas are shown in Table 1.

TABLE 1

| Symbol | Meaning | Unit |
| --- | --- | --- |
| L | Length of circular pipe | m |
| D | Internal diameter of circular pipe | m |
| ΔP | Differential pressure before and after circular pipe | Pa |

TABLE 1-continued

| Symbol | Meaning | Unit |
|---|---|---|
| V | Flow speed of fluid in circular pipe | m/s |
| Q | Flow quantity of fluid in circular pipe | m³/s |
| μ | Viscosity coefficient of fluid | Pa·s |
| γ | coefficient | Pa/m |

If the flow quantity of the fluid, the viscosity, the diameter of the circular pipe, and the differential pressure at both ends of the circular pipe are known, then the length L of the circular pipe can be calculated from Formula (5) above.

Because of this, it is possible to determine based on Formula (5) the length, internal diameter, and number of circular pipes (i.e., supply liquid circulation tubes) that are needed to obtain the desired liquid flow quantity.

In some cases, the actual hollow fiber-shaped tube does not have a perfectly circular cross section or the cross sectional area of the tube is not uniform. Because of this, it is preferable that the necessary length is accurately calculated and then adjusted by first preparing a hollow fiber-shaped tube having a length calculated using Formula (4), and then determining the flow quantity coefficient thereof by experiment. For example, in Formula (4), because the length of the pipe is proportional to the diameter of the pipe to the power of four, if there is a variation of 10% in the diameter of the pipe, the length of the pipe varies by 46.4%.

When supplying the supply liquid from the supply section through the supply liquid circulation tube to the primary fluid circulation tube, then it is necessary for a pressure P1 of the supply liquid in the supply section and a pressure P2 of the primary fluid in the primary fluid circulation pipe to satisfy the following formula.

$$P1-P2>0$$

By setting the pressure P1 using a pump or the like such that it satisfies this formula, it is possible to supply the supply liquid to the primary fluid inside the primary fluid circulation tube using the differential pressure.

The pressure P1 is set such that P1/P2 is 1.01 to 10, and preferably 1.05 to 10, and more preferably 1.1 to 5.

The supply liquid flow quantity is a value that is substantially proportionate to a differential pressure ΔP (=P1−P2) between the upstream side and the downstream side of the supply liquid circulation tube.

By setting the pressures P1 and P2 within the aforementioned range, even if there is a change in the flow quantity and pressure of the primary fluid (i.e., ultrapure water or the like), the necessary and sufficient quantity of supply liquid can be supplied without any complicated control such as feedback control being performed.

For example, if ammonia water (i.e., the supply liquid) is supplied to ultrapure water (i.e., the primary fluid), and the resulting ammonia-containing ultrapure water (i.e., an ammonia solution) is to be used as washing water, then if the pH of the washing water is a suitable value, a suitable washing effect can be obtained.

Because ammonia is slightly alkaline, it is difficult for any change to occur in the pH of the ammonia solution even if there is considerable variation in the supply quantity of the ammonia water (i.e., of the supply liquid).

Because of this, if the pressure P1 of the supply liquid in the supply section is set to a suitable value, it is possible to accurately determine the supply quantity of the supply liquid without performing feedback control and supply a quantity of supply liquid that enables a satisfactory washing effect to be obtained.

Ultrapure water is used above as an example of the primary fluid, and an electrolytic aqueous solution is used as an example of the supply liquid. Acid or alkaline can be used as the electrolyte. Examples of such an acid include hydrochloric acid, sulfuric acid, hydrogen fluoride, nitric acid, and carbonic acid (i.e., carbon dioxide). Examples of such an alkaline include ammonia, potassium hydroxide, and sodium hydroxide.

If the electrolyte concentration of the primary fluid (i.e., ultrapure water) to which the supply liquid (i.e., an electrolytic aqueous solution) is supplied is too low, the washing effect is reduced, while if it is too high, there is a possibility that the electronic material will be damaged. Therefore, a concentration of 0.00001 to 0.1 percent by mass and, more preferably, a concentration of 0.0001 to 0.01 percent by mass is desirable.

If a ratio X/Y between a flow quantity X of the supply liquid and a flow quantity Y of the primary fluid is too low, the washing effect is reduced, while if it is too high, there is a possibility that the electronic material will be damaged. Therefore, a ratio of 1/10000000 to 1/1000, and preferably, a ratio of 1/1000000 to 1/1000, and more preferably, a ratio of 1/500000 to 1/2500 is desirable.

If the supply quantity of the supply liquid is 0.001 to 10 cm³ per minute, then the liquid supply method of the present invention is particularly effective. This is because it is difficult to manufacture a flow quantity adjusting valve that is able to stably set the flow quantity of the supply liquid within this range.

The present invention will now be more specifically described using examples and comparative examples. It should be noted, however, that the present invention is not limited to and restricted by these examples.

EXAMPLE 1

Using ultrapure water having a specific resistance of 18.2 MΩ·cm at 25° C. as a primary fluid, this primary fluid was circulated through a primary fluid circulation tube. The flow quantity was varied in stages after each minute. The supply water pressure was 0.20 MPa·G (=2 kgf/cm²·G).

A 29% ammonia aqueous solution was used as the electrolytic aqueous solution.

A supply solution circulation tube (i.e., a circular pipe) will now be designed in order to prepare an ammonia aqueous solution of 6 mg/liter by adding a 29 wt % ammonia aqueous solution to ultrapure water.

The physical properties of a 29 wt % ammonia aqueous solution are as follows.

γ(specific gravity)=0.900, μ(viscosity)=1.0×10⁻³ Pa·s (1.0 cP).

If the ultrapure water flow quantity is 1 liter/minute (i.e., 1 kg/minute), then a flow quantity Q of the 29 wt % ammonia aqueous solution is 1×10³×6×10⁻⁶÷0.29=0.0207 g/min=0.207÷0.900=0.0230 cm³/min.

Next, the length L is determined for when the differential pressure ΔP between the upstream side and the downstream side of the supply liquid circulation tube ΔP=0.05 Mpa and the internal diameter D of the supply liquid circulation tube D=0.100 mm.

Formula (6) below is derived from the above Formula (5).

[2]

$$L = \frac{\pi}{128} \cdot \frac{D^4}{\mu \cdot Q} \cdot \Delta P \quad (6)$$

If Formula (6) is modified such that the practical units in Table 2 can be used, then Formula (7) is derived. The symbols and units in Formulas (6) and (7) are shown in Table 2.

[3]

TABLE 2

$$L = 1,473,000 \cdot \frac{D^4}{\mu \cdot Q} \Delta P \quad (7)$$

| Symbol | Meaning | Absolute unit system Formula (6) | Practical units Formula (7) |
|---|---|---|---|
| L | Length of circular pipe | m | mm |
| D | Internal diameter of circular pipe | m | mm |
| ΔP | Differential pressure before and after circular pipe | Pa | MPa |
| Q | Flow quality of fluid in circular pipe | m³/s | cm³/min |
| μ | Viscosity coefficient of fluid | Pa · s | cP |

Here, when the values were substituted such that D=0.1, ΔP=0.05, μ=1.0, and Q=0.0230, then L becomes 1,473,000× 0.100⁴×0.5÷1.0÷0.0230=320 mm, so that the length L of the circular pipe may be taken as 320 mm.

In order to compare the calculated value and the actual value of the flow quantity flowing through the supply liquid circulation tube, four hollow fiber-shaped tubes made of poly 4-methyl pentene 1 and having a diameter of 0.1 mm and a length of 300 mm were arranged in parallel, and the flow quantity was measured when pure water was made to flow therethrough.

Experiments were then performed while the differential pressure (ΔP) was varied in a range of 0.05 to 0.15 MPa. The discrepancy in the flow quantity between the calculated value and the actual value was 17 to 27%. From these results it was learnt that, even if it was assumed that the cause of the discrepancy was entirely due to discrepancies in the diameters of the hollow fiber-shaped tubes, the discrepancy in the diameters did not exceed 6%.

From these results it was determined that this hollow fiber-shaped tube was sufficient for the liquid supply apparatus.

A liquid supply apparatus was then manufactured using two hollow fiber-shaped tubes made of poly 4-methyl pentene 1 and having a diameter of 0.1 mm and a length of 300 mm.

Using this liquid supply apparatus, a minute amount of 29 wt % ammonia water was added to ultrapure water in an attempt to prepare ultrapure water having a pH of 10.

The flow quantity of the ultrapure water was then increased in stages by 0.5 liters per minute from 0.5 to 9 liters per minute at a water pressure of 0.2 MPa·G. The flow quantity was then varied in stages each minute. When the ammonia water was pressurized at 0.25 MPa·G in the supply portion, the ammonia water was added to the ultrapure water by the differential pressure between the pressure of the ammonia water and the pressure of the ultrapure water.

As is shown in Table 3, when the pH of the ammonia supplemented ultrapure water thus obtained was measured, it was found that an ammonia aqueous solution having a stable pH was obtained irrespective of the flow quantity of the ultrapure water.

TABLE 3

| Ultrapure water flow quantity (liters/minute) | pH |
|---|---|
| 0.5 | 10.3 |
| 1.5 | 10.1 |
| 3.0 | 10.0 |
| 4.5 | 9.9 |
| 6.0 | 9.8 |
| 7.5 | 9.8 |
| 9.0 | 9.8 |

COMPARATIVE EXAMPLE 1

Instead of a supply liquid circulating tube formed by a hollow fiber-shaped tube, a liquid supply apparatus having a general purpose tube was used.

A liquid supply apparatus will now be designed in order to prepare an ammonia aqueous solution of 600 mg/liter to correspond to 100 times the 6 mg/liter ammonia aqueous solution prepared in the Example.

The physical properties of the 29 wt % ammonia aqueous solution were as follows.

γ(specific gravity)=0.900, μ(viscosity)=1.0×10⁻³ Pa·s (1.0 cP).

If the ultrapure water flow quantity is 1 liter/minute (i.e., 1 kg/minute), then a flow quantity Q of the 29 wt % ammonia aqueous solution Q=1×10³×600×10⁻⁶÷0.29=2.07 g/min=2.07÷0.900=2.30 cm³/min.

Next, the length L was determined for when the differential pressure ΔP between the tube front and rear ΔP=0.01 Mpa and the internal diameter D of the tube D=5 mm. Formula (8) below is derived from the above Formula (1).

[4]

$$L = \frac{\pi}{128} \cdot \frac{D^4}{\mu \cdot Q} \cdot \Delta P \quad (8)$$

If Formula (8) is modified such that practical units can be used, then Formula (9) is derived.

[5]

$$L = 1,473,000 \cdot \frac{D^4}{\mu \cdot Q} \cdot \Delta P \quad (9)$$

Next, the required length (L) when the values were substituted such that ΔP=0.01 MPa, the tube internal diameter D=5, Q=2.30 cm³/minute, and μ=1.0 cP, and a general purpose tube was used was determined. In this case, L=1,473,000×5⁴× 0.01÷1.0÷2.3=4×10⁶=4000 m. Accordingly, for practical purposes it is not possible to design a liquid supply apparatus having a tube of this length that can actually be used.

Moreover, in order to prepare a solution having the same ammonia concentration as that in Example 1 (i.e., 6 mg/liter), as a result of the same calculation as that described above, it was discovered that the length of the tube needed to be 400 km. This was also not possible for all practical purposes.

In the above apparatus, if the differential pressure at the front and rear of the tube is taken as 1/100th of 0.01 MPa, then the length of the tube only needs to be 40 m, however, it is not possible to obtain a sufficient ammonia water supply quantity from this small differential pressure. Moreover, if a pressure variation arises in the ultrapure water, there is a possibility that ultrapure water will flow in reverse back into the ammonia aqueous solution.

EXAMPLE 2

Ultrapure water having a specific resistance of 18.2 MΩ·cm at 25° C. was used as the primary fluid.

Figure 2:
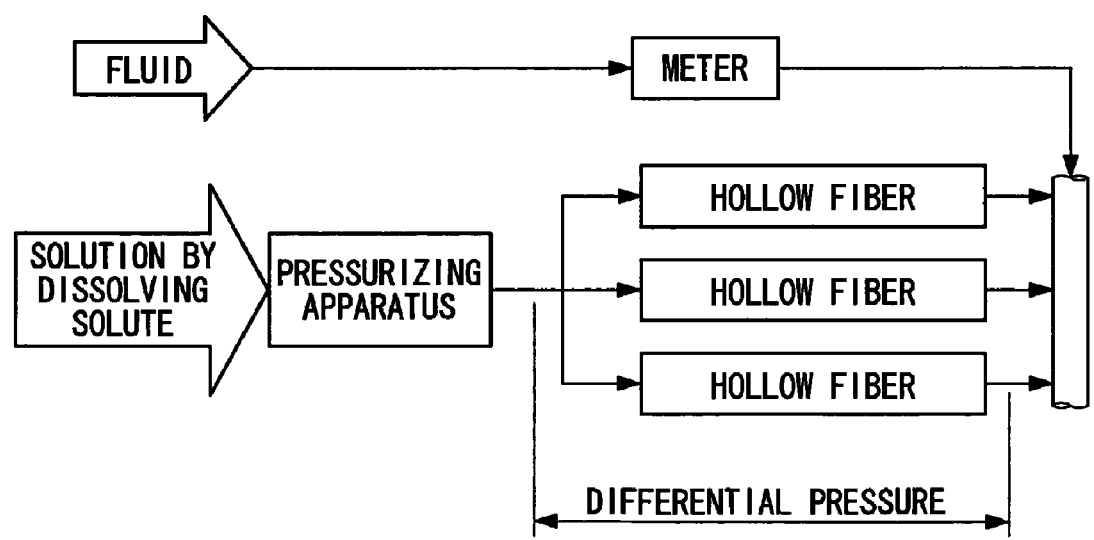
FIG. 2 is a schematic structural view showing an example of the liquid supply apparatus of the present invention.

As is shown in FIG. 2, a liquid supply apparatus that used a supply liquid circulation tube formed by a hollow fiber-shaped tube was prepared.

A liquid supply apparatus 1 shown here is provided with a supply section 3 that delivers supply liquid, and a supply liquid circulation tube 4 that delivers supply liquid from the supply section 3 to a primary fluid circulation tube 2.

The supply liquid circulation tube 4 is a hollow fiber-shaped tube made of poly 4-methyl pentene 1 and having an internal diameter of 0.1 mm and a length of 300 mm. In this liquid supply apparatus 1, two supply liquid circulation tubes 4 are used.

Using this liquid supply apparatus 1, 29 wt % ammonia water was added to ultrapure water in an attempt to prepare ultrapure water having a pH of 9.3 to 10.

The flow quantity of the ultrapure water was then changed within a range of 12 to 24 liters per minute (i.e., 12, 18, and 24 liters per minute) at a water pressure of 2 to 0.3 MPa·G.

When the flow quantity of the ultrapure water was 12 liters per minute, the ammonia water was pressurized to a pressure 0.1 MPa higher than the water pressure of the ultrapure water (i.e., 0.27 MPa) in the supply section 3. When the flow quantity of the ultrapure water was 18 or 24 liters per minute, the differential pressure was not adjusted, however, the ammonia was added by the differential pressure between the pressure of the ammonia water and the pressure of the ultrapure water.

The specific resistance and pH of the ammonia supplemented ultrapure water thus obtained were measured using a specific resistance meter and a pH meter. When making these measurements, three lots of one liter of ammonia supplemented ultrapure water obtained under the same conditions were collected, and these were measured. The results are shown in Table 4. From this table it was found that a reproducible ammonia aqueous solution having a stable specific resistance and pH was able to be obtained irrespective of the flow quantity of the ultrapure water.

TABLE 4

| Ultrapure water flow quantity | Measurement | Ultrapure water pressure (MPa) | Ammonia water pressure (MPa) | pH (−) | Specific resistance (MΩ · cm) |
| --- | --- | --- | --- | --- | --- |
| 12 | First | 0.269 | 0.369 | 9.77 | 0.12 |
|  | Second | 0.269 | 0.368 | 9.73 | 0.13 |
|  | Third | 0.27 | 0.368 | 9.74 | 0.13 |
| 18 | First | 0.234 | 0.368 | 9.77 | 0.13 |
|  | Second | 0.234 | 0.368 | 9.72 | 0.12 |
|  | Third | 0.234 | 0.368 | 9.72 | 0.12 |
| 24 | First | 0.189 | 0.368 | 9.73 | 0.12 |
|  | Second | 0.189 | 0.368 | 9.73 | 0.12 |
|  | Third | 0.189 | 0.368 | 9.73 | 0.12 |

EXAMPLE 3

In the same way as in Example 2, a liquid supply apparatus was prepared using a supply liquid circulation tube 4 formed by a hollow fiber-shaped tube made of poly 4-methyl pentene 1 and having an internal diameter of 0.1 mm and a length of 300 mm. In this liquid supply apparatus 1, four supply liquid circulation tubes 4 are used.

Using this liquid supply apparatus 1, 29 wt % ammonia water was added to ultrapure water in an attempt to prepare ultrapure water having a pH of 9.3 to 10.

The flow quantity of the ultrapure water was then changed within a range of 12 to 24 liters per minute (i.e., 12, 18, and 24 liters per minute) at a water pressure of 2 to 0.3 MPa·G. When the flow quantity of the ultrapure water was 12 liters per minute, the ammonia water was pressurized to a pressure 0.1 MPa higher than the water pressure of the ultrapure water (i.e., 0.27 MPa) in the supply section 3. When the flow quantity of the ultrapure water was 18 or 24 liters per minute, the differential pressure was not adjusted, however, the ammonia was added by the differential pressure between the pressure of the ammonia water and the pressure of the ultrapure water.

The specific resistance and pH of the ammonia supplemented ultrapure water thus obtained were measured using a specific resistance meter and a pH meter. When making these measurements, three lots of one liter of ammonia supplemented ultrapure water obtained under the same conditions were collected, and these were measured. The results are shown in Table 5. From this table it was found that a reproducible ammonia aqueous solution having a stable specific resistance and pH was able to be obtained irrespective of the flow quantity of the ultrapure water.

TABLE 5

| Ultrapure water flow quantity | Measurement | Ultrapure water pressure (MPa) | Ammonia water pressure (MPa) | pH (−) | Specific resistance (MΩ · cm) |
|---|---|---|---|---|---|
| 12 | First | 0.275 | 0.375 | 9.88 | 0.07 |
|    | Second | 0.275 | 0.375 | 9.88 | 0.07 |
|    | Third | 0.275 | 0.375 | 9.89 | 0.07 |
| 18 | First | 0.238 | 0.375 | 9.88 | 0.07 |
|    | Second | 0.238 | 0.375 | 9.88 | 0.07 |
|    | Third | 0.238 | 0.375 | 9.88 | 0.07 |
| 24 | First | 0.192 | 0.375 | 9.90 | 0.07 |
|    | Second | 0.192 | 0.375 | 9.90 | 0.07 |
|    | Third | 0.192 | 0.375 | 9.92 | v |

Industrial Applicability

As is described above, in the present invention, when a supply liquid is supplied from a supply section to a primary fluid circulation tube through a supply liquid circulation tube using a narrow diameter supply liquid circulation tube, a pressure P1 of the supply liquid in the supply section and a pressure P2 of the primary fluid in the primary fluid circulation tube are set such that P1−P2>0. As a result, it is possible to set the supply quantity of the supply solution using the differential pressure between the upstream side and the downstream side of the supply liquid circulation tube.

Consequently, it is possible to easily and accurately determine a supply quantity for a minute amount of supply liquid.

Accordingly, it is possible to prevent variations in the concentration of a solution even when the supply quantity is a minute quantity and a high concentration supply solution is used.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

What is claimed is:

1. A liquid supply method that prepares a solution by continuously supplying a supply liquid to a primary fluid that is circulating in a primary fluid circulation tube, that uses a liquid supply apparatus that comprises:

a supply section that delivers the supply liquid; and
a supply liquid circulation tube formed in a hollow fiber shape that causes the supply liquid to flow from the supply section to the primary fluid circulation tube, the internal diameter of the supply liquid circulation tube being between 0.05 and 0 0.5 mm,
when the supply solution is supplied from the supply section to the primary fluid circulation tube via the supply liquid circulation tube, a pressure P1 of the supply liquid in the supply section and a pressure P2 of the primary fluid in the primary fluid circulation tube always satisfy the formula P1−P2>0;
P1/P2 is 1.01 to 10;
P1 is controlled so as to maintain a constant level;
the primary fluid is ultrapure water;
the supply liquid is an electrolytic aqueous solution; and
an electrolyte concentration of the primary fluid to which the supply liquid is supplied is between 0.00001 and 0.1 percent by mass,
wherein a supply quantity of the supply liquid can be determined without performing feedback control,
the supply liquid circulation tube is made from a material selected from the group consisting of fluorine resin and poly(4-methylpentene-1) based resins, and
a ratio X/Y between a flow quantity X of the supply solution and a flow rate Y of the primary fluid is between 1/1000000 and 1/1000.

2. The liquid supply method according to claim 1, wherein a supply quantity of the supply liquid is between 0.001 and 10 $cm^3$/ minute.

* * * * *